United States Patent [19]
Kimura et al.

[11] Patent Number: 5,227,799
[45] Date of Patent: Jul. 13, 1993

[54] ROAD VOID SEARCH RADAR SYSTEM

[75] Inventors: Noriaki Kimura; Kanji Murasawa; Masuo Konishi, all of Okayama, Japan

[73] Assignee: Mitsui Engineering & Shipbuilding Co., Ltd., Japan

[21] Appl. No.: 848,108

[22] Filed: Mar. 9, 1992

[51] Int. Cl.$^5$ .............................................. G01S 13/04
[52] U.S. Cl. ......................................... 342/22; 342/27
[58] Field of Search ................... 342/22, 27, 70, 117

[56] References Cited

U.S. PATENT DOCUMENTS 4,698,634  10/1987  Alongi et al. .................... 342/22
4,967,199  10/1990  Gunton et al. .................... 342/22

Primary Examiner—T. H. Tubbesing
Attorney, Agent, or Firm—Blakely, Sokoloff, Taylor & Zafman

[57] ABSTRACT

A road void search radar system includes a rotary encoder, a radar controller, an analyzer, and a recording unit. The rotary encoder generates a pulse signal having a period corresponding to a predetermined distance interval traveled by a vehicle. The radar controller outputs a wave every time the pulse signal is supplied from the rotary encoder. The analyzer analyzes an underground state by processing the output signal received from the radar controller. The recording unit records digital data signals and analyzes results.

2 Claims, 1 Drawing Sheet

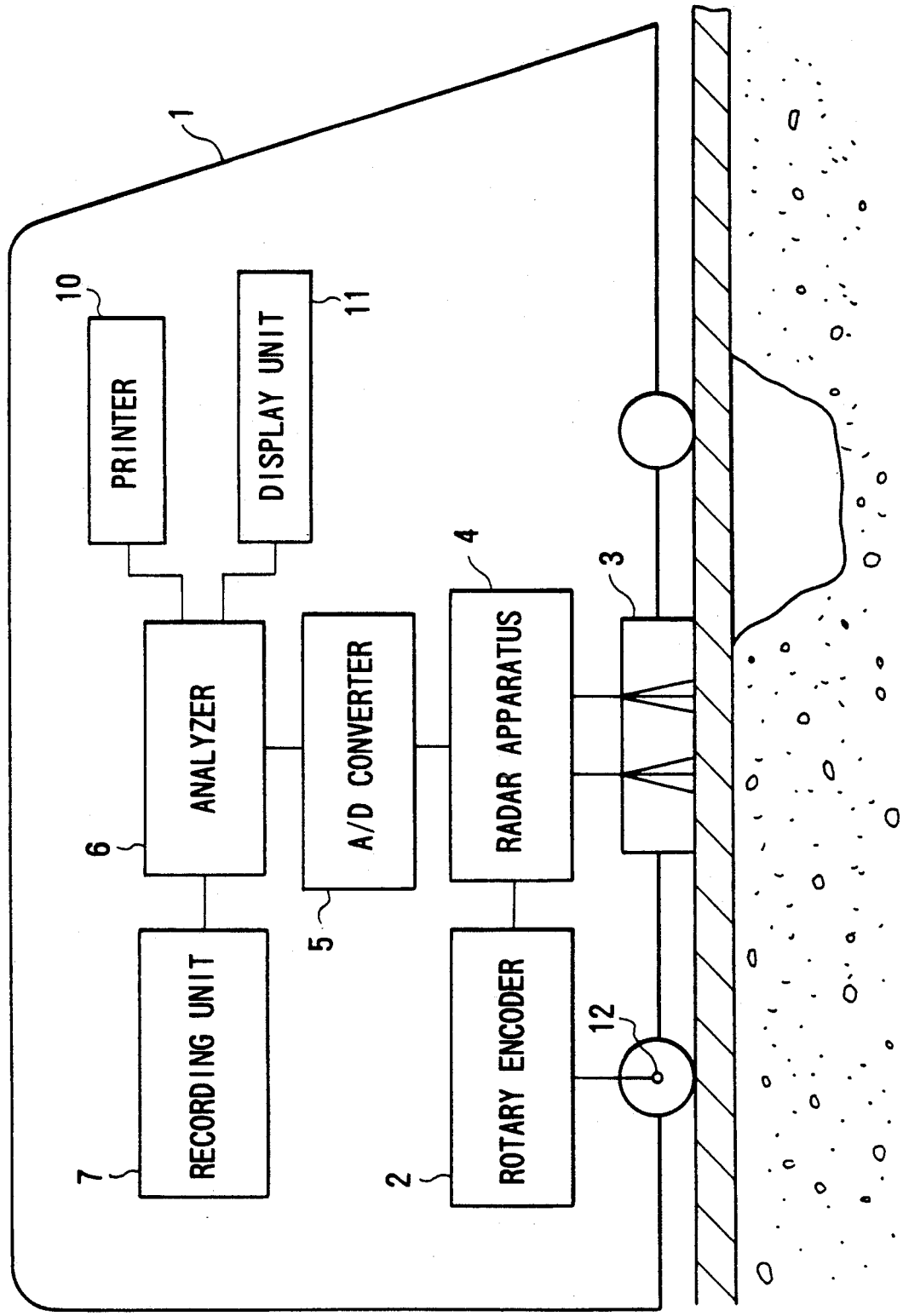

ROAD VOID SEARCH RADAR SYSTEM

BACKGROUND OF THE INVENTION

The present invention relates to a road void search radar system mounted on a vehicle and designed to search for, e.g., a void under the ground.

As is known, after road construction is performed, the road is reliably restored by filling holes with sand to leave no void under the ground. If, however, such construction is carelessly performed, a void may be formed under the ground because of a change in state with a lapse of time. As a result, for example, the road collapses or sinks posing a hazard. Under the circumstances, various methods have been proposed to search for a void under the ground.

In a conventional search apparatus, however, since an antenna portion is designed to be pushed by hand, its low traveling speed disturbs traffic. In addition, the safety of an operator cannot be ensured.

Furthermore, since the conventional apparatus analyzes the state of a road and records data at the same time, the traveling speed of the vehicle is limited by the data processing. Moreover, since the apparatus transmits waves all the time, the amount of data is excessively increased. Such an increase in data amount is a factor that interferes with real-time processing.

SUMMARY OF THE INVENTION

It is an object of the present invention to provide a road void search radar system which can satisfactorily obtain necessary data even at a high traveling speed.

It is another object of the present invention to provide a road void search radar system which can operate at a high speed to prevent disturbance in traffic.

It is still another object of the present invention to provide a road void search radar system which can ensure the safety of an operator.

In order to achieve the above objects, according to the present invention, there is provided a road void search radar system comprising a rotary encoder for generating a pulse signal having a period corresponding to a predetermined distance interval traveled by a vehicle, a radar controller for outputting a wave every time the pulse signal is supplied from the rotary encoder, an analyzer for analyzing an underground state by processing the output signal received from the radar controller, and a recording unit for recording radar signals.

BRIEF DESCRIPTION OF THE DRAWING

The drawing is a block diagram showing a system according to an embodiment of the present invention.

DESCRIPTION OF THE PREFERRED EMBODIMENT

The drawing shows a system according to an embodiment of the present invention. Referring to the drawing, reference numeral 1 denotes a vehicle; 2, a rotary encoder for generating a pulse signal having a period corresponding to the travel distance of the vehicle 1, i.e., one pulse signal is generated every time the vehicle 1 travels a predetermined interval distance; 4, a radar controller for outputting a wave having a predetermined frequency every time the pulse is supplied from the rotary encoder; 3, a pair of antennas for transmitting/receiving waves; 5, an A/D converter for converting analog signals received from the radar controller 4 to digital signals; 6, an analyzer for analyzing the output signal from the A/D converter 5; 7, a recording unit for recording the radar signals; 10, a printer for printing the result; 11, a display unit for displaying the result; and 12, a wheel.

In the system having the above-described arrangement, when the vehicle 1 travels, the rotary encoder 2 mounted on the wheel 12 or axle generates a pulse signal having a period corresponding to the travel distance. The pulse signal is supplied to the radar controller 4. Therefore, the radar controller 4 transmits a wave through the transmitting antenna 3 for a predetermined period of time every time the pulse is supplied from the rotary encoder 2. The wave is radiated into the ground and is detected, as a reflected wave corresponding to the underground state, by the receiving antenna 3. The detected wave is received from the radar controller 4 and is outputted as an analog signal.

This analog signal is converted into a digital signal by the A/D converter 5. The analyzer 6 then analyzes the state of the road on the basis of the digital signal. The signal analyzed by the analyzer 6 is recorded by the recording unit 7. At the same time, the information represented by the signal is printed by the printer 10 and displayed on the display unit 11.

That is, the present invention is designed to perform high speed digital data recording. In order to perform high speed digital data recording, the data amount must be decreased somehow.

Therefore, the radar system is designed not to transmit waves all the time but to intermittently transmit waves, thus decreasing the amount of data to be acquired. For this purpose, the rotary encoder 2 is arranged to generate periodic pulse signals upon traveling of the vehicle, and the radar controller is designed to transmit a wave for the predetermined period of time every time the pulse signal is supplied. With this arrangement, data is intermittently obtained, and the data amount is reduced enough to allow digital data recording. Note that the predetermined period of time during which a wave is transmitted is set to be shorter than the period of a pulse signal.

As has been described above, according to the radar system mounted on a vehicle, a wave is obtained from the radar controller every time a pulse signal is generated from the rotary encoder mounted on the wheel, and digital data obtained in real time and data analyses are performed after the data recording is finished. Therefore, necessary data can be satisfactorily obtained even at a high traveling speed. In addition, since the system is mounted on the vehicle, scanning can be performed at a high speed within the allowable range of the operation speed of the radar system. This prevents disturbance in traffic. In addition, since an operator is in the vehicle, his/her safety can be ensured.

What is claimed is:

1. A road void search radar system comprising:
   a rotary encoder for generating a pulse signal having a period corresponding to a predetermined distance interval traveled by a vehicle;
   a radar controller for transmitting a wave as an output signal every time the pulse signal is supplied from said rotary encoder;
   an analyzer for analyzing an underground state by processing the output signal received from said radar controller; and
   a recording unit for recording digital data signals and analyzing the result.

2. A system according to claim 1, wherein said radar controller further comprises means for setting the period of time during which the wave is transmitted to be shorter than the period of the pulse signal.

* * * * *

UNITED STATES PATENT AND TRADEMARK OFFICE
CERTIFICATE OF CORRECTION

PATENT NO. : 5,227,799
DATED : July 13, 1993
INVENTOR(S) : Kimura et al

It is certified that error appears in the above-indentified patent and that said Letters Patent is hereby corrected as shown below:

On the title page: Item [73]

[73] Assignee: after "Japan"
insert --; Ministry of Construction - Kinki Regional Construction - Bureau, Japan--

Signed and Sealed this

Eighteenth Day of October, 1994

Attest:

BRUCE LEHMAN

*Attesting Officer*    *Commissioner of Patents and Trademarks*